Aug. 20, 1963  J. DIMEFF  3,100,990
TWO-PLANE BALANCE
Filed Aug. 2. 1960  3 Sheets-Sheet 1
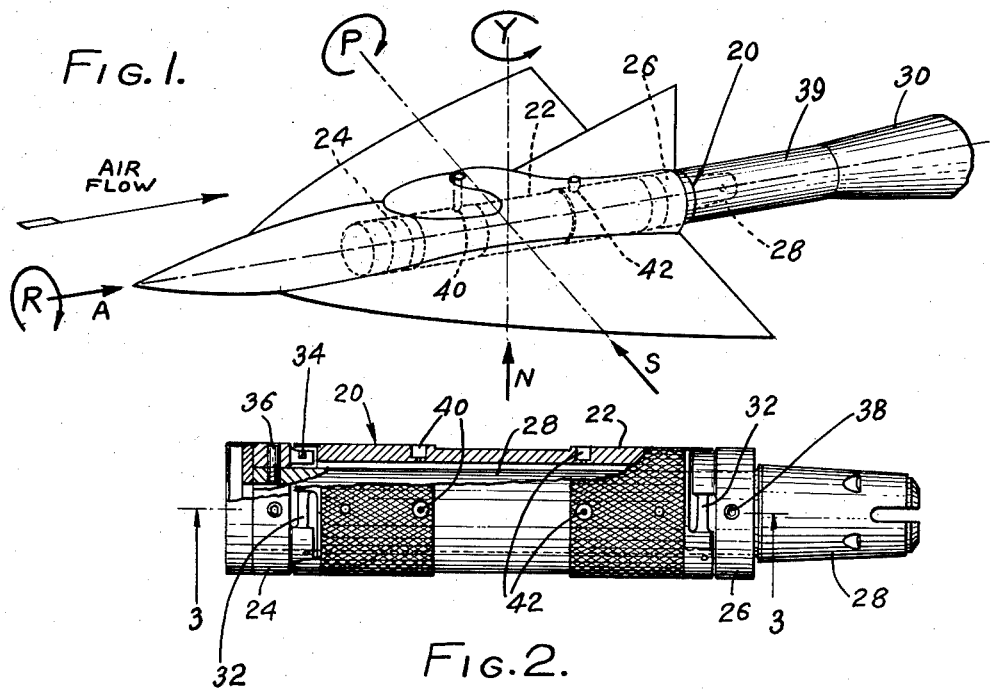
FIG. 1.
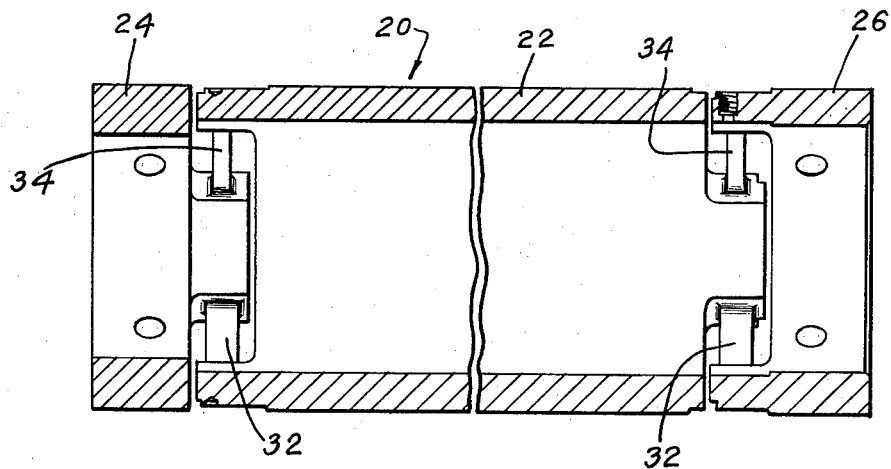
FIG. 2.
FIG. 3.
INVENTOR.
JOHN DIMEFF
BY
ATTORNEYS Aug. 20, 1963

J. DIMEFF 3,100,990

TWO-PLANE BALANCE

Filed Aug. 2. 1960

INVENTOR.
JOHN DIMEFF
BY
*G. D. O'Brien*
*K. F. Ross*
ATTORNEYS

Aug. 20, 1963  J. DIMEFF  3,100,990
TWO-PLANE BALANCE

Filed Aug. 2. 1960  3 Sheets-Sheet 3

LEGEND
A = AXIAL FORCE
N = NORMAL "
S = SIDE "
R = ROLLING MOMENT

INVENTOR.
JOHN DIMEFF
BY
G. L. O'Brien
K F Ross
ATTORNEYS

# United States Patent Office 3,100,990
Patented Aug. 20, 1963

3,100,990
TWO-PLANE BALANCE
John Dimeff, San Jose, Calif., assignor to the United States of America as represented by the Administrator of the National Aeronautics and Space Administration
Filed Aug. 2, 1960, Ser. No. 47,122
12 Claims. (Cl. 73—147)
(Granted under Title 35, U.S. Code (1952), sec. 266)

The invention described herein may be manufactured and used by or for the Government of the United States of America for governmental purposes without the payment of any royalties thereon or therefor.

This invention relates to a force measuring device, more particularly, it relates to a device for simultaneously measuring multiple force components on mechanical devices, aircraft, stationary structures or the like exposed to these forces. For the purposes of illustration the device is described in connection with its use in measuring six-force components on airplane models during testing in high velocity wind tunnels; however, the invention is not limited to this application. The six-force components are side, yaw, normal, pitch, drag or axial, and roll, represented herein by the letters S, Y, N, P, A, and R, respectively. The data obtained is used for empirical studies relating to improvements in the design of aircraft.

Simultaneous measurement of axial, normal, side, pitch, yaw, and roll forces on an airplane model being tested have been limited in accuracy because of errors introduced by temperature changes and the disturbing interaction of the various force moments involved. Prior art balances for making these measurements have been of two types. One type is the instrument constructed according to a serial construction wherein a model supported at one end of a metal bar transmits forces through a series of sections to a ground support member, the forces applied to the balance being derived from the elastic deformation of the sections. The second type of construction is a parallel construction, that is, a hollow cylinder mounted over a fixed rod passing therethrough and connected thereto by means of a number of connecting elements. The forces are derived from the elastic deformation of the webs or connecting members.

The chief disadvantage of the serial balance is that large interactions of one measured force on another measured force seriously reduce the accuracy of the balance. The disadvantages of parallel balances lie in the fact that their construction requires a number of support sections (three or greater) and temperature levels and gradients between these sections introduce expansions which in turn cause deformation of the elastic members used to measure the applied strain. Another factor which introduces errors in this type of construction is the relative stiffness of the members. It is seen, therefore, that when the balance is unsymmetrically heated, or when the heating varies with time, or the stiffness of the various components are unlike, the deformations of the balance members (that of the drag measuring element being most critical) are related in a complex manner. These deformations are difficult to separate from those deformations produced by forces desired to be measured since they depend upon thermal conductivity, mass distributions, and heat transfer rates to the model being supported.

It is therefore an object of this invention to provide a force measuring instrument having a construction in which errors due to thermal expansion and contraction in various parts of the balance are compensated and errors due to interactions of the various forces being measured, and varying stiffnesses of parts of the instrument are reduced to a minimum.

It is another object of this invention to provide a parallel balance constructed to measure in two planes forces applied to an object in a maximum number of planes.

It is still another object of this invention to provide a balance which is insensitive to the relative displacement of support members in a direction parallel to the axis of a balance due to temperature changes.

It is a further object of this invention to provide a force measuring balance which is insensitive to the opposing deflections in the support members caused by temperature changes.

The two-plane balance of this invention comprises a cylinder having a central "floating" section or force transmitting element and an anchoring or end restraining element at either end thereof secured to a rigid metal ground support element passing through the cylinder and out of contact with the central section. The force transmitting element is connected at either end to an end restraining section by web members made integral therewith and upon which strain sensing elements are placed. The two vertical cross sections including the web members constitute the two planes in which forces are measured. In operation, the ground support element is anchored to a support and forces to be measured are applied to the force transmitting element and measured by means of the strain sensing elements on the webs.

The construction and operation of the invention will now be described with reference to the accompanying drawings hereby made a part of this specification and in which:

FIG. 1 is a schematic showing illustrating forces measured on an airplane model during wind tunnel testing;

FIG. 2 is a partial cutaway top plan view of the balance based on its orientation for use in the application to be described;

FIG. 3 is a longitudinal cross-section taken on the line 3—3 of FIG. 2 showing the construction and arrangement of the web members in the two-plane balance;

Figure 4:
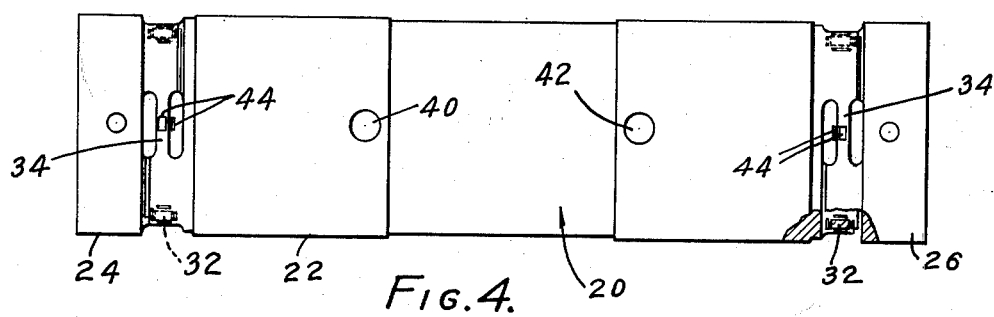
FIG. 4 is a side elevational view of the two-plane balance partially cut away.
Figure 5:
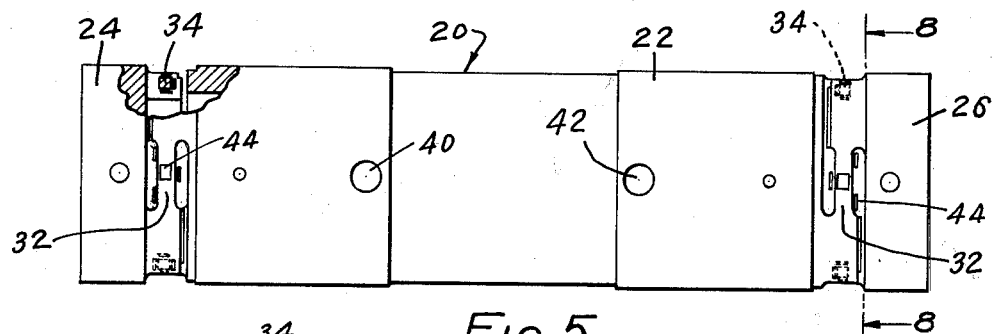
FIG. 5 is a top plan view of the balance partially cut away.

Referring to FIG. 1, there is shown an airplane model mounted on the balance for testing in a wind tunnel. Arrows on the drawing indicate, by way of example, forces on an airplane model which are ordinarily measured in wind tunnel testing.

Referring now to FIG. 2, the two-plane balance 20 comprises central force transmitting member 22 with integrally connected end restraining members 24 and 26 by which attachment is made to metal ground support member 28 which is to be anchored to a support 30 as shown in FIG. 1. Web members 32 and 34 connect the force transmitting member 22 of the two-plane balance with the end restraining members 24 and 26. Forces applied to force transmitting member 22 are transmitted to webs 32 and 34 to ground support member 28. In the application of the balance shown in FIG. 1, the hollow airplane model is placed over the balance and secured to the central force transmitting section 22 by bolts or otherwise at 40 and 42 in a manner so that it is out of contact with end restraining members 24 and 26. End restraining members 24 and 26 are secured to ground support rod 28 by bolts 36 and 38. The ground support member 28 is secured to a support 30 as shown in FIG. 1 by means of a partially hollow support section 39, for example. The diameter of ground support member 28 is such that it is not in contact with the interior surface of the central force transmitting member 22 of the two-plane balance so that the central section is free to move with respect to the anchored end restraining members 24 and 26, restraint of its movement resulting only through the web members 32 and 34.

Figure 11:
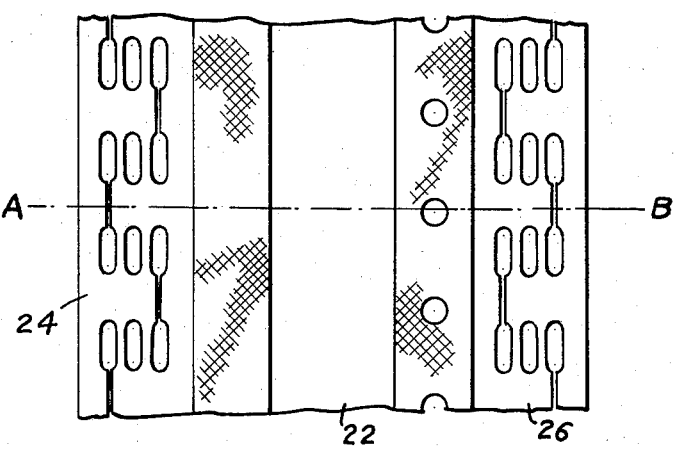
FIG. 11 is a planar development of the outer cylinder of the two-plane balance showing a method of connecting the central floating section or force transmitting element and the end restraining members by webs.
Figure 12:
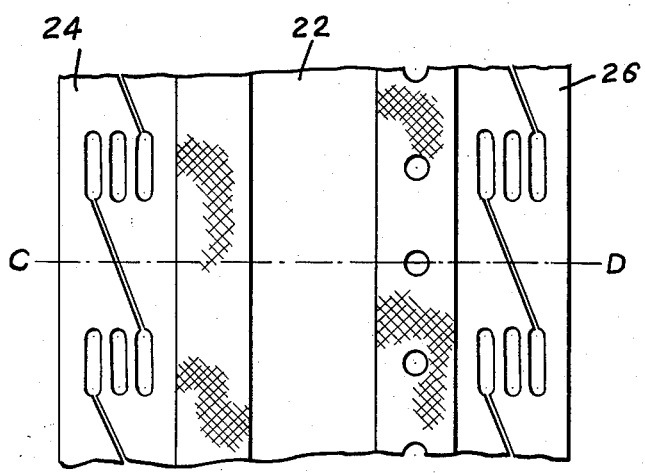
FIG. 12 is a showing similar to that of FIG. 11 in which a modified method of making the milling cuts between the end sections and the force transmitting element is shown.

Referring to FIG. 3, there is shown the construction of web sections located in the two planes of measurement of the balance. In the application of the balance to be described, webs 32 are used as side force elements and webs 34 are used as normal force elements. The orientation of the balance for measuring side and normal forces is not critical. For the application described, multiple webs are used for measuring the various components and thicker and stronger webs are used as side force webs. Single webs can be used and the relative dimension of the webs will depend on the relative magnitude of forces being measured. It is to be noted that the construction of these web sections is optional depending upon the forces to be measured and that a variety of designs can be used to measure a large number of applied forces in the two parallel measurement planes. The two planes of measurement are defined by vertical cross-sections at each end of the balance through the centers of the web elements. As shown in FIGS. 11 and 12, the construction of the web sections is not critical it being required only that they be constructed so that forces may be measured in the two parallel measurement planes. FIGS. 11 and 12 illustrate two methods of making the web sections by milling cuts, the separating cuts being horizontal in the modification of FIG. 11 and diagonal in the modification of FIG. 12. The axes of the balances are represented by AB and CD in FIGS. 11 and 12, respectively.

Figure 6:
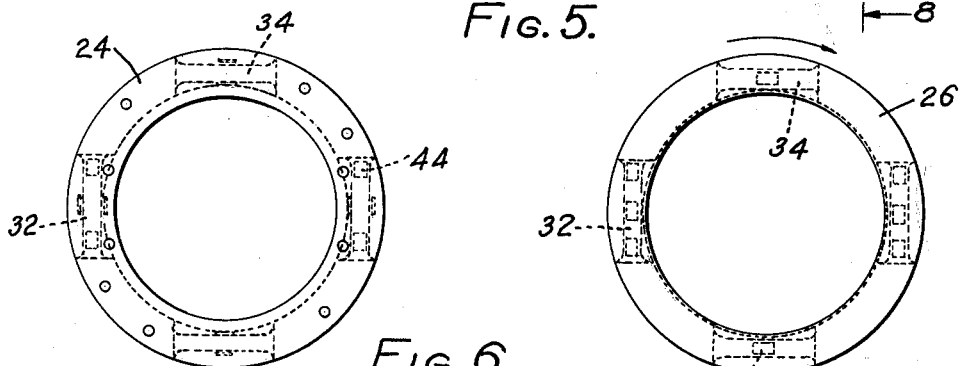
FIG. 6 is a descriptive view looking toward the left end of FIG. 5 showing the positioning of strain gage members on the connecting web members.
Figure 7:
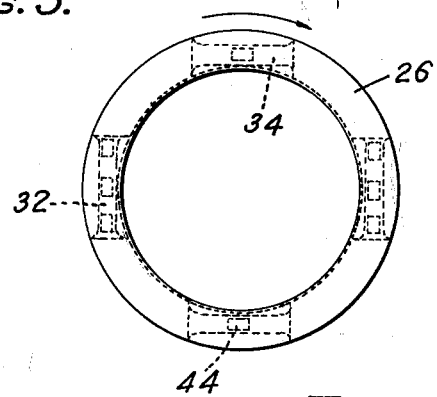
FIG. 7 is a view similar to that of FIG. 6 looking at the right end of FIG. 5.
Figure 8:
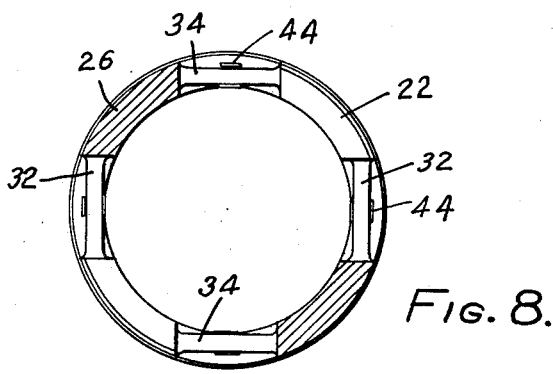
FIG. 8 is a vertical section taken on the line 8—8 of FIG. 5.

Reference is now made to FIGS. 4 through 8, inclusive, for illustration of one application of the invention, the figures showing the positioning of strain gages on the web members for measuring moments on an airplane model under test in a high velocity wind tunnel. The strain gages are represented by the numeral 44 in FIG. 4 and the designation is not repeated for all gages in the remaining figures as the gage elements are conventional for use in this type application. FIG. 4 shows the positioning of strain gages on side force elements 32 at either end of the balance for measuring side forces at each end. To obtain yawing moment the difference between side forces at either end of the balance is measured. As shown in FIGS. 6 and 8, measurements of side forces are made simultaneously on the opposite side of the balance by positioning strain gages on the appropriate web sections on that side. The positioning of strain gages on the webs for measuring normal, roll and axial forces is illustrated in FIGS. 5, 6, 7 and 8. Pitching moment is measured as a difference between front and rear normal forces. Roll measurements are made by mounting gages on both normal force and side force elements. Axial forces are measured by appropriate positioning of strain gages on normal force webs 34 as shown. They may be made with strain gages positioned on both side and normal force elements. The accuracy of both roll and axial force measurements is improved by averaging measurements made at the forward and the rearward measuring webs.

It will be seen from the above description that the number of support planes in the balance are reduced to a minimum, restraint being applied to the force transmitting member through elements confined essentially to two separate planes. Thermal expansion errors are introduced only through relative contraction or expansion of the inner ground support member 28 and the outer cylinder or force transmitting member 22. This deformation always results in a forwardly acting force at one of the support planes and an equal rearwardly acting force in the other support plane. To measure axial force, the appropriate strain gage resistances are so connected that the device senses the displacement of these support members in a direction parallel to the axis of the balance and is sensitive to the sum of the two displacements. Such a device is insensitive to the opposing deflections caused by temperature changes. This results in a balance which is capable of reading force applied along its axis in the presence of high thermal gradients without the introduction of thermal errors.

It will be seen that the construction of the invention embodies support members which are located in areas near the maximum radius in each plane, as contrasted to previous constructions in which supporting members pass through or near the axis of the balance. Among other advantages, this feature permits construction of a balance with a continuous hole through the center of the balance-inner-support rod. This opening allows free passage of air for use with models in wind tunnel applications and provides a space for electrical leads and/or pressure tubing leading from the rear ground support member to the forward portion of the balance or to the models supported thereon.

Figure 9:
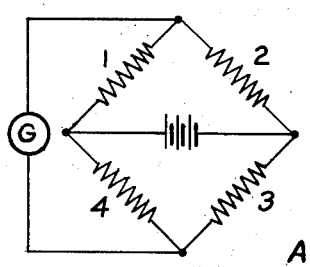
FIG. 9 is a diagrammatic representation of a bridge circuit used for measuring applied forces on the balance.
Figure 10:
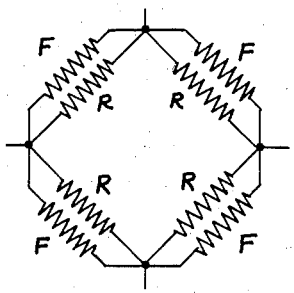
FIG. 10 is a schematic representation of a bridge circuit similar to that of FIG. 9 with the exception that it is arranged to measure the sum (or difference) of two strain gage assemblies.

The operation of the strain gage bridges illustrated in FIGS. 9 and 10 is conventional for the present type of application and is analogous to that set forth in U.S. Letters Patent 2,741,120 issued to Robert B. Ormsby, Jr., April 10, 1956. In the two figures the numerals 1, 2, 3, 4 and the letters F and R correspond to the resistance elements of the strain gages as represented schematically.

It will be apparent from the above description that many modifications are possible in the light of the above teaching. It is, therefore, to be understood that within the scope of the appended claims the invention may be practiced otherwise than as specifically described herein.

What is claimed is:

1. A temperature compensated force measuring device in which substantially all contraction and expansion of elements due to temperature changes is along the longitudinal axis of the device, comprising, in combination, a hollow force transmitting element; a restraining element at each end of said force transmitting element; a plurality of flexure means at either end of said force transmitting element lying in planes at each of its ends substantially perpendicular to the longitudinal axis of the force transmitting element and connecting said force transmitting element and said restraining elements, said planes being the planes in which applied forces are measured; force sensing means on said flexure means; and a ground support member supported concentrically of said hollow force transmitting element out of contact therewith and securely attached to each of said restraining elements, said ground support member constructed for attachment to a support; whereby as a result of said construction in which all flexure elements through which applied forces are measured are located in two parallel planes at either end of the force transmitting member substantially perpendicular to the mutual longitudinal axis of the force transmitting member and the concentrically arranged, fixed ground support member and serve as connections between these members, axial expansion and contraction due to temperature changes can be readily compensated.

2. The device of claim 1 in which said flexure means are web sections.

3. The device of claim 2 in which said web sections are constructed integral with the force transmitting element and the restraining elements.

4. The device of claim 1 in which said force transmitting element and said restraining elements are hollow and cylindrical and said ground support member extends into the hollow cylindrical restraining elements.

5. The device of claim 1 having at least two flexure means in each of said planes positioned for measuring applied forces in mutually perpendicular planes.

6. The device of claim 1 having two pairs of parallel spaced apart flexure means in each of said planes, said pairs in each of said planes being positioned for measuring applied forces in mutually perpendicular planes.

7. A temperature compensated force measuring device in which substantially all contraction and expansion of elements due to temperature changes is along the longitudinal axis of the device, comprising, in combination, a hollow cylindrical force transmitting element; a hollow cylindrical restraining element at each end of said force transmitting element; a plurality of web sections at either end of said force transmitting element lying in planes at each of said ends substantially perpendicular to the horizontal axis of said force transmitting element and integrally connecting said force transmitting element and said restraining elements, said web sections being uniformly spaced circumferentially of said force transmitting element, alternate web sections in each of said planes positioned with their long axes in mutually perpendicular planes; force sensing elements on said web sections; and a hollow ground support member arranged concentrically of said force transmitting element out of contact therewith and extending into said restraining elements and securely attached thereto, the hollow construction of the ground support member providing a space for the passage of air and location of associated equipment; whereby as a result of said construction in which all flexure elements through which applied forces are measured are located in two parallel planes at either end of the force transmitting member substantially perpendicular to the mutual longitudinal axis of the force transmitting member and the concentrically arranged, fixed ground support member and serve as connections between these members, axial expansion and contraction due to temperature changes can be readily compensated.

8. A temperature compensated two-plane force balance for simultaneously measuring applied side, normal, axial and roll forces on a body, with a minimum of interaction between the different moments acting on the body, comprising, in combination, a cylindrically-shaped hollow force transmitting member constructed for mounting a test body; a cylindrically-shaped hollow restraining member at each end of said force transmitting member of substantially the same diameter as the force transmitting member; at least two flexible web members at each end of said force transmitting element in a single plane at each of said ends perpendicular to the longitudinal axis of the force transmitting member and integrally connecting said force transmitting member and said restraining members, each of said two flexible web members positioned for measuring applied forces in mutually perpendicular planes; a ground support member supported concentrically of said hollow force transmitting member out of contact therewith and securely attached to each of said restraining members, the axial forces produced by thermal deformations of said transmitting element being counterbalanced by forces produced by thermal deformations of said ground support member; said ground support member constructed for attachment to a support; and means on said web members for sensing said forces.

9. The two-plane force balance of claim 8 having two pairs of parallel spaced apart flexible web members in each of said planes, each of said pairs being positioned for measuring applied forces in mutually perpendicular planes.

10. Claim 8 in which said force transmitting member and said restraining members are constructed with alternate mutually interlapping extensions and cutout portions at their adjacent ends and the extensions of the force transmitting member and the restraining members are integrally connected by said flexible web members.

11. Claim 9 in which said force transmitting member and said restraining members are constructed with alternate mutually interlapping extensions and cutout portions at their adjacent ends and the extensions of the force transmitting member and the restraining members are integrally connected by said flexible web members 12. A temperature compensated two-plane force balance for simultaneously measuring applied side, normal, axial and roll forces on a body, with a minimum of interaction between the different moments acting on the body, comprising, in combination, a cylindrically shaped hollow force transmitting member constructed for mounting a test body; a cylindrically-shaped hollow restraining member at each end of said force transmitting member of substantially the same diameter as the force transmitting member, said force transmitting member and said restraining members being constructed with alternate mutually interlapping extensions and cutout portions at their adjacent ends with the extension being 90° apart in assembly; two pairs of parallel spaced apart flexible web members connecting the extensions of the force transmitting member and the restraining members at each end of the force transmitting member, said web members being located in a single plane at each of said ends perpendicular to the longitudinal axis of the force transmitting member and said pairs in each of said planes being positioned for measuring applied forces in mutually perpendicular planes, web members on top and bottom of the balance being side force measuring webs and web members on the sides of the balance being normal force measuring webs for a given orientation of the balance; a ground support member supported concentrically of said hollow force transmitting member out of contact therewith and securely attached to each of said restraining members; the axial forces produced by thermal deformations of said transmitting element are counterbalanced by axial forces produced by thermal deformations of said ground support member; said ground support member constructed for attachment to a support; means on said web members for sensing said forces; and means connected electrically to said force sensing means for indicating the magnitude of said forces.

References Cited in the file of this patent

UNITED STATES PATENTS

| | | |
|---|---|---|
| 2,741,120 | Ormsby | Apr. 10, 1956 |
| 2,782,636 | Peucker | Feb. 26, 1957 |
| 2,844,027 | Davie | July 22, 1958 |